April 30, 1929.  E. C. NEWTON  1,711,244
PISTON RING
Filed July 19, 1927   2 Sheets-Sheet 1

Inventor
Edward C. Newton
By R. S. Burry
Atty.

April 30, 1929.  E. C. NEWTON  1,711,244
PISTON RING
Filed July 19, 1927    2 Sheets-Sheet 2
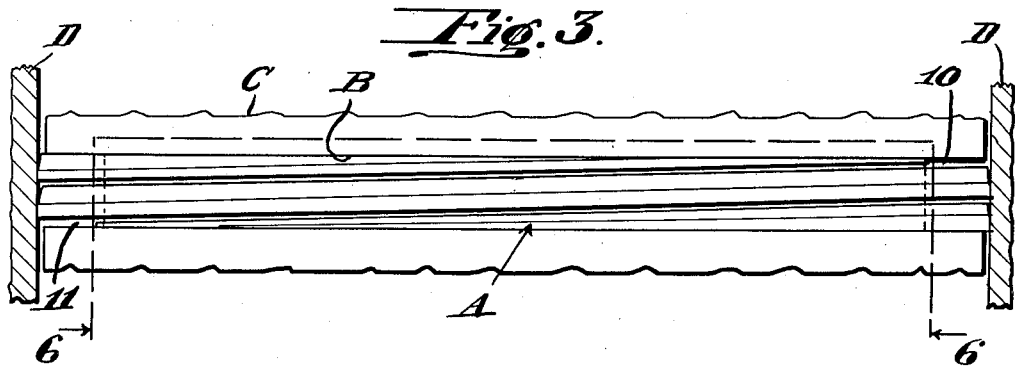
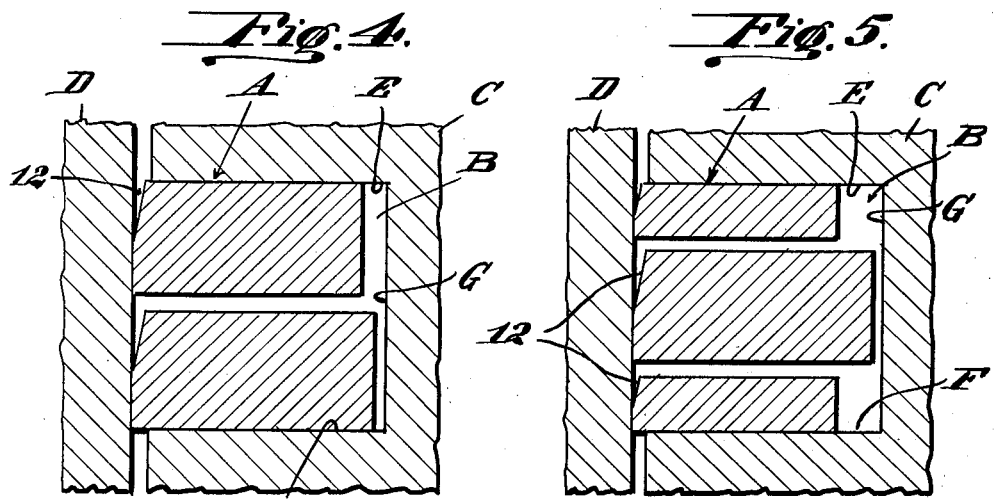
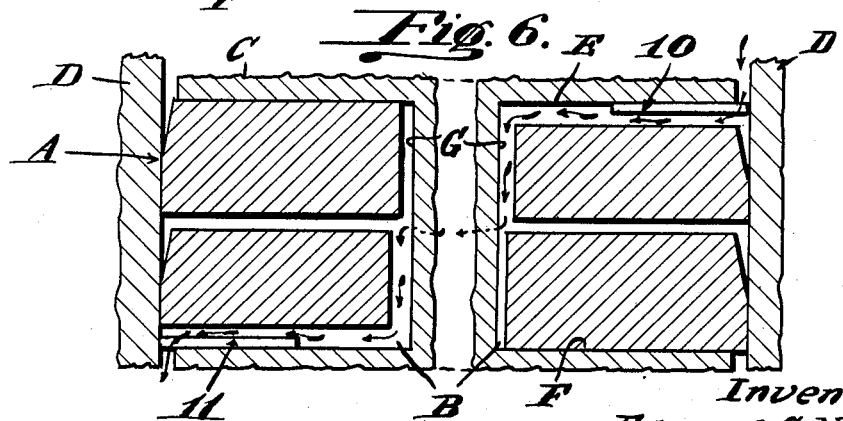
Inventor
Edward C. Newton
By R. S. Berry
Atty.

Patented Apr. 30, 1929.

1,711,244

UNITED STATES PATENT OFFICE.

EDWARD C. NEWTON, OF LOS ANGELES, CALIFORNIA.

PISTON RING.

Application filed July 19, 1927. Serial No. 206,808.

This invention relates to a piston ring of the type such as is employed on the pistons of internal combustion engines, and more particularly pertains to the class of piston rings comprising a body having a spiral formation.

An object of the invention is to provide a spiral piston ring embodying a plurality of convolutions arranged with contiguous convolutions spaced apart, whereby the spiral ring may be readily screwed into position within the annular ring grooves with which the ordinary engine pistons now commonly in use are generally provided, and whereby the piston ring may be easily and quickly put in place.

Another object is to provide a construction in the end convolutions of the spiral ring whereby such end portions are rendered more yieldable transversely than the intermediate portions of the ring and whereby the end portions of the ring will not bear against the cylinder walls with as great pressure as that of the intermediate portion of the ring when the latter is under compression, so as to minimize scoring of the cylinder and also reduce frictional wear of the end portions of the ring.

Another object is to provide a construction in a spiral piston ring which will afford a by-pass for gases back of the ring through the ring groove of the piston on which the ring is mounted on starting movement of the piston, yet which is operable on accelerating the piston and during operation thereof to prevent the flow of gases back of the piston ring.

Another object is to provide a piston ring which is free of shoulders or abutments, thereby allowing the ring to freely expand longitudinally and thus insure its conformation with the cylinder walls on expansion of the latter, and also maintain the same constant wall pressure under varying temperatures.

Another object is to provide a construction whereby the outer lower edges of the convolution of the ring will act as scrapers on 'own stroke of the piston to then scrape back all excess oil from the cylinder walls, and on up stroke of the piston to permit the ring to pass over and leave a film of oil on the inner surface of the cylinder and at the same time hold sufficient oil between the spirals of the ring so as to evenly spread oil over the cylinder walls on the down stroke of the piston.

Another object is to provide a piston ring which is adapted to fill the ring groove in such manner as to prevent piston slap.

Another object is to provide a piston ring which will have a tendency to wear an out-of-round cylinder to a true round.

A further object is to provide a piston ring of the above character which is simple, efficient and practical.

With the foregoing objects in view together with such other objects and advantages as may subsequently appear, the invention resides generally in providing a piston ring of spiral form having a plurality of spaced convolutions in which the end convolutions are tapered throughout the major portion of their length both longitudinally and transversely thereof, and in beveling the external faces of the convolutions, as will be hereinafter pointed out with more particularlity and as illustrated in the accompanying drawing in which:

Fig. 3 is a view in side elevation, illustrating the ring as applied;

Figure 1:
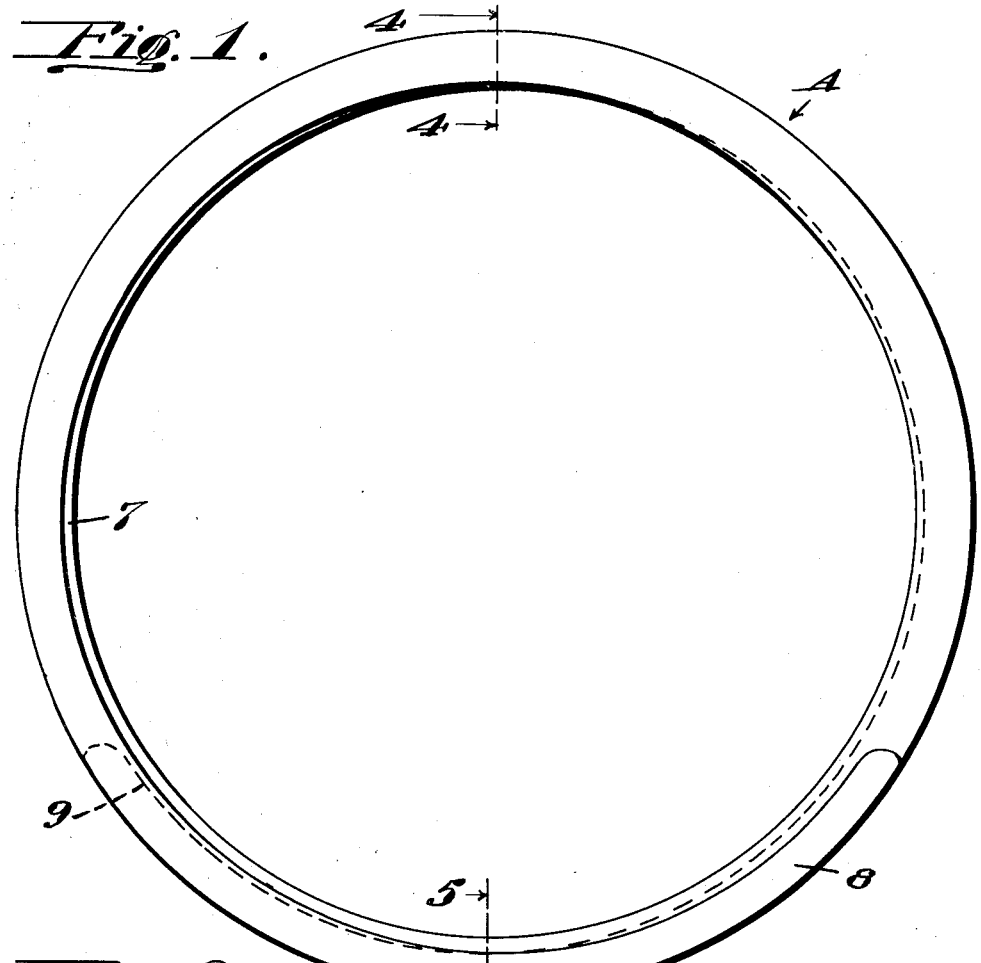
Fig. 1 is a plan view of the piston ring.

Figs. 4 and 5 are enlarged details in section of the piston ring, showing it as applied and illustrating respectively sections of the ring as seen on the lines 4—4 and 5—5 of Fig. 1;

Fig. 6 is a diagram illustrating portions of the piston ring in section as seen on the line 6—6 of Fig. 3, as viewed in the direction indicated by the arrows and showing the manner in which a by-pass is afforded between the inner periphery of the piston ring and the bottom wall of the piston groove from the upper to the lower side of the ring, when the piston is stationary or the ring not thermally expanded.

Referring to the drawings more specifically, A indicates generally my improved spiral ring; B designates an annular ring groove formed in a piston C, and D indicates a cylinder wall encircling the piston; fragmentary portions of the piston and cylinder wall being shown. The piston ring groove B is formed in the manner common in conventional engine piston constructions; it being of rectangular cross section and having parallel side walls or landings E and F extending at right angles to a bottom wall G.

In carrying out my invention the spiral ring A is formed with a plurality of convolutions embodying an intermediate convolution 7 and end convolutions 8 and 9; the intermediate convolution 7 being of uniform thickness and transverse width throughout, and the end convolutions 8 and 9 formed in continuation of the intermediate convolution having a length of approximately three fourths of the circumference of the ring and being tapered both longitudinally and transversely throughout so that the end portions of the end convolutions will be thin and narrow relatively to the intermediate convolution whereby the end convolutions will have greater transverse flexibility and will be rendered more yieldable than the intermediate convolution so as not to bear against the cylinder walls with as great pressure as does the intermediate convolution when the ring is applied and under compression. In thus forming the ring the intermediate convolution has concentric inner and outer peripheries with the inner and outer circumferential faces of the ring formed on true circles, while the end convolutions are progressively narrowed from the inside out so that their inner margins will extend eccentric to the inner margin of the intermediate convolutions. The outer margins of the end convolutions coincide with the outer perimeter of the intermediate convolution. The ring is thus formed normally with its outside periphery on a true circle throughout.

Figure 2:
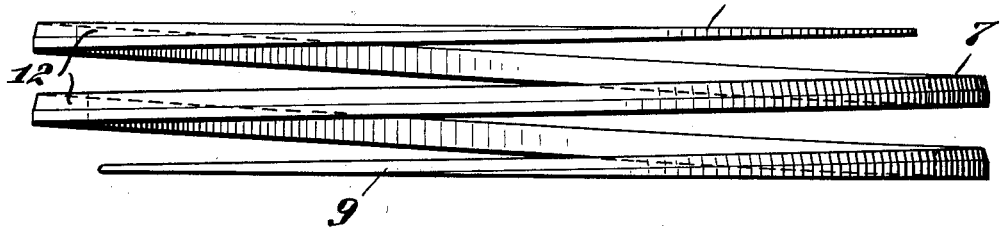
Fig. 2 is a view of same as seen in side elevation, showing the ring in its normal position.

The contiguous spirals of the ring are normally spaced apart as shown in Fig. 2 and the opposed outer faces of the end convolutions 8 and 9 extend parallel with each other and are disposed in diagonal relation to their spiraled inner faces so that when the ring is placed in a piston groove B its opposite sides or end faces will seat in intimate contact with the parallel landings or side faces E and F of the piston groove except for short distance extending along the upper and lower faces of the intermediate convolution projecting beyond the ends of the terminals of the end convolutions so as to afford a slight gap between the landings E and F and the end faces of the ring when the latter is applied to a piston ring groove. These gaps, indicated at 10 and 11 in Fig. 3, afford such restricted communication between the outer and inner circumferential faces of the ring as to permit on initial movement of the piston the passage of gases from above the piston ring through the gap 10 to the space back of the piston ring and then through the gap 11 to the under side of the piston as illustrated diagrammatically in Fig. 6. This admits of easy starting or initial movement of a piston equipped with the ring. The gaps 10 and 11 are offset or spaced from each other circumferentially of the ring such distance that the gas flowing from one gap to the other rearwardly of the ring must necessarily traverse a passage back of the ring of such length that on acceleration of the piston, gases will be trapped in the space because of not having sufficient time in which to effect their escape, thus effectively preventing flow of the gases past the piston ring under normal working speed of the piston. The extent of the distance between the gaps will vary on expansion and contraction of the ring, expansion of the ring by heat when the engine is running acting to elongate the spirals and thereby increase the distance between the gaps, and contraction of ring on cooling thereon as when stopping the engine decreasing the distance between the gaps. Hence the greater the heating of the engine the greater will be the expansion of the ring and accordingly the more effective the sealing action of the ring will become, and conversely cooling of the engine as when it is stopped will contract the ring so as to permit the flow of gases past the ring when such flow is needed in order to render the piston more free to move on starting the engine. This entrapment of the gases back of the piston ring occurs on compression stroke of the piston which effects compression of the entrapped gases in the space back of the piston ring. On intake stroke of the piston, portions of the compressed entrapped gases will be drawn back into the engine cylinder. This arrangement, while insuring easy starting of the piston will effectively inhibit flow of gases past the piston ring when the piston is accelerated.

The ring is so designed as to afford .010 inch clearance between the inner face of the intermediate convolution and the bottom wall of the piston groove, which clearance is taken up by the expansion of the ring under the action of heat, as when the engine is operating, so that the ring will then completely fill the space between the cylinder walls and the bottom wall of the piston groove and thereby effectively prevent piston slap, prevent passage of gases back of the piston and prevent formation of carbon between the piston and the walls of the piston groove.

The outer circumferential faces of the several convolutions are beveled, as indicated at 12, so that the lower marginal edges of the convolutions will closely contact the inner surface of the engine cylinder and act as a scraper on down stroke of the piston to then remove all excess oil from the cylinder wall and to afford clearance at the upper margins of the convolutions operable to effect distribution of the lubricating oil over the cylinder walls on up stroke of the piston. It will be noted that in effecting distribution of the lubricant over the cylinder walls, the oil on being collected in the space between the spirals will on upward movement of the piston be caused to move lengthwise of the spirals and accordingly will be spread over the cylinder wall in a spiral direction thus insuring thorough lubrication of the cylinder.

The ring thus formed is made of metal possessing a resilient quality so as to yieldably oppose positioning of the adjacent convolutions in contact with each other and whereby the convolutions tend to spring apart when under compression, and whereby on contracting the ring the convolutions will tend to unwind to normal.

In the application of the spiral ring, it may be placed in the ring groove in any suitable manner but by reason of its resilience and its spiral form it may be put in place by spreading the convolutions and screwing the ring into place within the groove. When the ring is positioned within the groove, it will be placed under compression and by reason of its tension, the end spirals will be caused to bear closely against the landing faces of the ring groove. When the ring is disposed in the groove, its inner periphery will normally be spaced from the bottom wall of the groove and its outer perimeter will project beyond the outer circumferential faces of the piston. When the piston is placed in a cylinder, the ring will be contracted circumferentially and will thereby be placed under circumferential tension so that it will bear tightly against the inner peripheral surface of the engine cylinder. The inner periphery of the ring will then be spaced approximately .010th of an inch from the bottom wall of the ring groove, as before stated, but on expansion of the ring and piston under the action of heat will be caused to seat against the bottom of the groove. The convolutions being long and slender will be quite flexible and accordingly the ring will accommodate itself to the contour of the cylinder. The spiral formation of the ring and the absence of shoulders or abutments thereon allows the ring to freely expand longitudinally to conform to any expansion or contraction of the cylinder walls and in this way maintain a practically even wall pressure at all times.

By forming the end convolution, with a double taper, the end portions of the ring are rendered quite flexible transversely, thereby preventing excessive friction and wearing of the thinner portions of the ring and thus minimizing scoring of the engine cylinders.

I claim:

1. A piston ring comprising a plurality of convolutions, the end convolutions of which are tapered both longitudinally and transversely so as to possess greater yieldability and resiliency than the contiguous convolution.

2. A spiral piston ring embodying an intermediate convolution of uniform width and equal thickness throughout, and end convolutions formed in continuation of the intermediate convolution, said end convolutions being tapered longitudinally and transversely throughout, and all of said convolutions being beveled on their outer circumferential faces.

3. In combination with cylinder and a piston in the cylinder having an annular ring groove formed with parallel side walls, a piston ring comprising a tensioned spiraled body the convolutions of which are spaced apart, said spiral ring being positioned in the ring groove on the piston under compression whereby the end faces thereof will bear against the side walls of the ring groove, and its outer periphery will bear against the cylinder, there being transverse gaps at the termination of the end convolutions normally affording a by-pass between the side walls of the ring groove and the piston ring; said ring being so proportioned to the depth of the ring groove as to normally afford a clearance between the inner periphery of the ring and the bottom of the groove which will be substantially taken up on expansion of the ring.

In testimony whereof, I have affixed my signature.

EDWARD C. NEWTON.